LASER RECORDER USING MEDIUM HAVING ENCAPSULATED CHEMICALS

Filed Jan. 3, 1966 2 Sheets-Sheet 1

INVENTOR
THEODORE H. BONN

BY Fred Jacob
ATTORNEY

Nov. 7, 1967 T. H. BONN 3,351,948
LASER RECORDER USING MEDIUM HAVING
ENCAPSULATED CHEMICALS
Filed Jan. 3, 1966 2 Sheets-Sheet 2

INVENTOR
THEODORE H. BONN
BY Fred Jacob
ATTORNEY

United States Patent Office 3,351,948

Patented Nov. 7, 1967

3,351,948
LASER RECORDER USING MEDIUM HAVING ENCAPSULATED CHEMICALS

Theodore H. Bonn, Lexington, Mass., assignor to Honeywell Inc., Minneapolis, Minn., a corporation of Delaware Filed Jan. 3, 1966, Ser. No. 518,438
15 Claims. (Cl. 346—76)

ABSTRACT OF THE DISCLOSURE

A recording system including a medium having a film of encapsulated chemicals deposited on at least one surface and means for directing a high-energy beam to discrete locations of the surface to record a mark by liberating said chemicals. Readout is effected by directing a low-energy beam to discrete locations on the surface and by sensing reflected or transmitted energy. Means are further provided for updating the recorded information.

The present invention relates in general to new and improved recording systems, in particular to an optical system wherein information is recorded on a sensitive medium and read out therefrom by means of a light beam.

The advantages of beam-recording on a medium are well known in the art, the most important one residing in the extremely high resolution obtainable. As consequence, beam-recorded data may be stored at very high densities on a medium, so that a relatively small recording surface is capable of holding large quantities of information. Another advantage of a beam-recording system is the speed with which different locations of the recording surface within a restricted area may be addressed by beam deflection. If the recording surface is large, coarse positioning of the beam to reach different general areas of the recording surface may involve mechanical movement. Within each such area, however, beam deflection can be carried out at high speeds and may be used in order to address different locations. As a consequence, very high data recording and readout rates are possible in such a system. The absence of a requirement for physical contact between the recording means and the recording medium is another noteworthy advantage of a beam recording system, which renders the latter more flexible for applications of different kinds.

Optical recording, wherein a light beam is used to effect a recording on a sensitive medium, has received a new impetus with the relatively recent development and perfection of various kinds of high-energy sources, e.g. laser sources. The extremely small resolution of the laser beam has been taken advantage of, notably in systems employing a photo-sensitive recording medium. While recording systems of this kind have been moderately successful, important disadvantages devolve from the requirement for a final step for developing the medium, which precludes the recording of additional information anywhere on the medium at a later time. This is particularly limiting in random access memory operations. Thus, these systems have utility only where no updating of the recorded information is expected. A call for a change of the recorded information ordinarily requires an extensive amount of new recording in such systems.

A further disadvantage of prior art optical recording systems, particularly those employing an electrostatic recording technique, resides in the relatively complex inking and toning procedures required. In addition to containing a large amount of "background" which shows up in the form grayish marks on the final copy, such recordings are also apt to fade upon exposure to light or to excessive humidity. Prior art optical recording systems also tend to become complex and costly when modifications of the intensity of the recorded mark, e.g. half tones, are called for. A requirement for color recording presents even greater difficulties and is completely unattainable in many optical recording systems which are presently in use.

Accordingly, it is a primary object of the present invention to provide a new and improved beam recording system which is not subject to the foregoing disadvantages.

It is another object of the present invention to provide an optical recording system wherein high density recording can be carried out at different times on a sensitive medium.

It is a further object of the present invention to provide an optical recording system wherein permanent marks may be recorded at a selected intensity and color.

It is an additional object of the present invention to provide a new, relatively simple and inexpensive beam recording system which readily lends itself to random access memory applications.

These and other objects of the present invention, together with the features and advantages thereof, will become apparent from the following detailed specification, when read in conjunction with the accompanying drawings, in which.

The invention makes use of a medium which is widely available today on a commercial basis. One example where such a medium is employed is generally referred to as carbonless or monocarbon paper. Such paper is available in sheets, wherein one surface is coated with the medium in the form of a film. The film, which may be plastic or the like, contains miniscule encapsulated droplets of dye which may be as small as $4 \times 10^{-5}$ inches in diameter. When used with a pencil or in a typewriter, mechanical pressure releases the dye in a restricted area to create a mark. The present invention contemplates the use of a similar medium, deposited on a suitable backing, in conjunction with a high-energy beam source. The heat created be the high-energy beam is capable of bursting the capsules in a restricted area to liberate their contents and to produce a mark. The invention further contemplates readout means, whereby the recorded marks on the medium are scanned by a low-energy beam and variations in darkness of the recording surface are optically sensed to generate a corresponding signal.

Figures 1A, 1B:
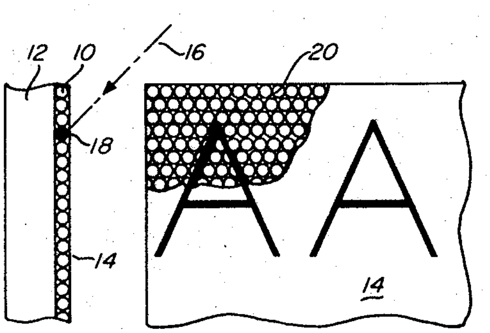
FIGURE 1A illustrates in cross-section a preferred recording medium for use with the present invention.
FIGURE 1B illustrates the surface of the recording medium of FIG. 1A.

With reference now to the drawings, FIGURE 1A illustrates in cross-sectional view the nature of the medium employed in the present invention. The medium comprises a film 10, deposited on a backing 12 which may consist of plastic, or coated paper, or some other suitable substrate for the film. The film itself may consist of chemicals encapsulated in wax or plastic. In a preferred embodiment of the invention, the aforesaid chemicals consist of a dye or ink. The encapsulating material is preferably opaque and of a color, e.g. white, which contrasts with that of the dye. In such a case, the surface 14 of the film has a relatively high reflectivity. As shown in FIGURE 1A, when a high-energy beam 16 impinges on a restricted location 18 of the surface 14, the capsule(s) located at this location burst by virtue of the heat applied by the beam. In a preferred embodiment, a laser beam is employed owing to its high resolution and its high energy content.

FIGURE 1B shows the surface 14 of the medium of FIGURE 1A, an exposed surface section 20 illustrating the capsules. By moving the beam through a desired pattern, the capsules are burst along the path described by the beam to form a permanent print of the pattern on the surface 14. By way of illustration, two characters "A" are shown recorded.

Figure 2:
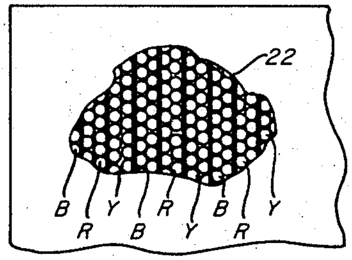
FIGURE 2 illustrates another embodiment of the medium shown in FIGURES 1A, 1B.

FIGURE 2 illustrates one embodiment of a medium which is suitable for color printing. As shown in the exposed area 22, the capsules are arranged in columnar form, the capsules in separate columns containing, for example, dyes having the pirmary colors red, blue and yellow. The encapsulating material is again assumed to be an opaque white, such that different columns are indistinguishable prior to recording. In order to make a mark of the desired color in a predetermined location, the laser beam is directed to that or those columns in the aforesaid location which contain capsules having the desired dye color. In such a case, the inability of the eye to resolve the individual colors at a normal viewing distance, due to the close spacing of the columns, supplies the desired combinational color effects. Alternatively, capsules in two or in all three columns are liberated at the desired location in order to bring about the proper color mixing of the dyes. It will be apparent from FIGURE 2 that the columns having capsules of different dye colors occur regularly along the medium, such that a colored mark may be made in any desired location of the surface. The respective columns are positioned in such close proximity as to permit the recording of a mark of a desired color sufficiently close to the chosen location that the displacement is indistinguishable to the human eye at a normal viewing distance.

Figure 3:
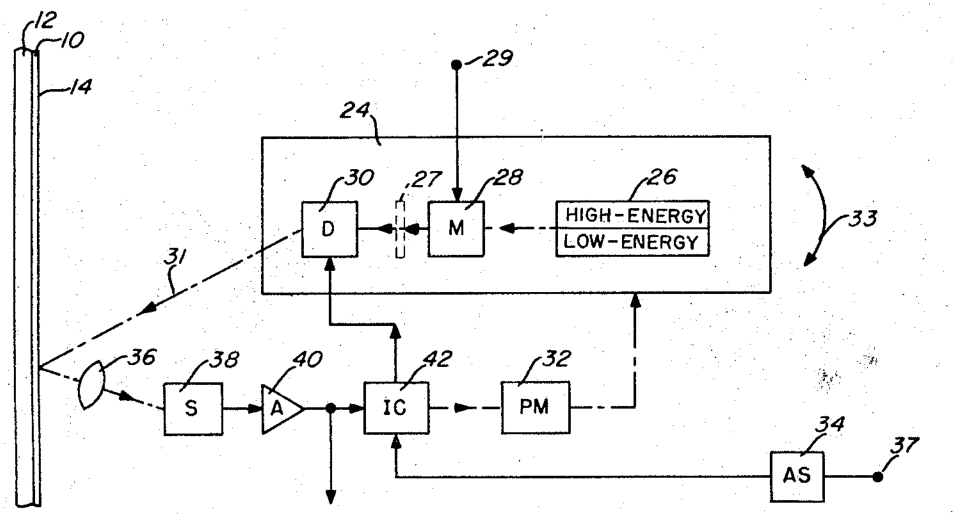
FIGURE 3 illustrates a preferred recording and readout apparatus for use with the media shown in FIGURES 1A, 1B and 2.

FIGURE 3 illustrates a preferred embodiment of recording and readout apparatus in accordance with the present invention, applicable reference numerals having been retained. The film 10 deposited on the backing 12, constitutes the target of a beam unit 24. The latter unit includes a beam source 26, succeeded by a beam modulator 28 and followed, in turn, by a beam deflection device 30. A mask 27 may be optionally interposed by the modulator ahead of the deflection device 30, as explained hereinbelow. As shown in the drawing, the source 26 is capable of selectively providing high-energy as well as low-energy beams. In the preferred embodiment of the invention which is illustrated herein, the high-energy beam will be considered to constitute a laser beam, while the low-energy beam will be assumed to be an ordinary light beam. The source 26 includes means for selectively generating these beams, as well as for focusing them to obtain high resoution. In accordance with principles well established in the art today, the modulator 28 is capable of controlling the intensity of the beam from the source 26 and/or of regulating its duration, e.g. by interposing a shield to prevent it from reaching the target. This action is carried out in accordance with signals received at an input terminal 29.

The deflection device 30 is capable of deflecting the beam 31 in a well known manner, e.g. by the use of electronic means, to reach any desired location on the surface 14 within a general area predetermined by a coarse beam setting. A positioning motor 32 is mechanically coupled to the unit 24. The latter may be arranged to pivot in the direction indicated by the arrow 33, as well as in a direction normal to the plane of the paper. In this manner, the positioning motor 32 is capable of imparting the aforesaid coarse setting to the beam.

As address selection circuit 34 is connected to receive address signals from a terminal 37 and to decode them for further application to an interpretive circuit 42. The outputs of the unit 42 are coupled to the positioning motor 32 and to the beam deflection device 30 respectively. A light sensing device 38, e.g. a set of photocells, is positioned to receive light from an optical system 36. The output of the sensing device 38 is coupled to an amplifier 40 whose output, in turn, is connected to the circuit 42. Additionally, the amplifier output may be coupled to subsequently connected utilization circuitry.

Figure 4:
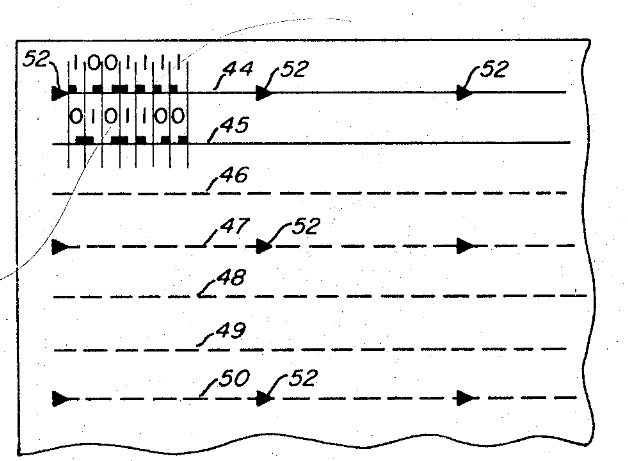
FIGURE 4 illustrates an exemplary record organization for digital data recording.

The operation of the apparatus shown in FIGURE 3 will be illustrated with the aid of the diagram shown in FIGURE 4. FIGURE 4 illustrates a portion of a preferred embodiment of a medium on the surface of which lines 44 and 45, together with an exemplary set of digital information, have been recorded. The illustrated recording technique employs a code wherein each binary "1" is represented by a mark and a space, while each binary "0" is represented by a space and a mark respectively. Additional lines 46 to 50 are indicated schematically to show where they will be recorded when required. Predetermined ones of the aforesaid lines contain triangular reference marks 52, which are pre-recorded on the surface of the medium. For the sake of illustration, every fourth line shown is seen to contain reference marks, although it will be understood that in actual practice as many as 50 to 100 lines may be recorded between the regularly spaced lines containing such marks. The marks 52 are preferably recorded at regular intervals within each line where they occur, such that they are aligned in columnar fashion on the medium surface.

In order to record the information shown in FIGURE 4, the beam must first be properly positioned on the line where recording is to take place. This is effected by means of the low-energy light beam operating in a closed loop servo system. The latter acts in response to appropriate address signals applied to the terminal 37, which are decoded by the address selection circuitry 34 and are thus applied to the interpretive circuitry 42. As previously explained, only the reference marks 52 are pre-recorded on the medium. As a reference mark is encountered by the light beam sweeping the general vicinity of a line determined by the applied address signal, the closed loop servo action, aided by the triangular shape of the reference mark, will cause the beam to lock on that line. Specifically, the light beam is reflected by the surface 14 and, upon passing the optical system 36, is detected by the light sensing device 38. The latter provides a responsive signal which varies in amplitude when a reference mark is scanned on the blank surface 14.

This signal is amplified and is applied to the interpretive circuitry 42 which provides appropriate positioning signals to take corrective action, if warranted. The positioning action may occur in two different ways. Coarse positioning may be carried out by energizing the motor 32 so as to pivot the unit 24 either in the direction of the arrow 33, or at right angles to the plane of the drawing. Fine positioning may be effected by energizing the device 30 to deflect the beam to the desired location.

Once the reference mark-bearing line (e.g. line 44 in FIGURE 4) which is nearest to the desired line (e.g. line 45) has been located, recording may begin. The source 26 is switched to provide a high-energy laser beam and the deflection device 30, now operating in the open loop servo mode, is energized by the applied address signal, by way of the circuits 34 and 42. The function of the deflection unit at this time is to move the laser beam up or down from the previously determined reference line to the desired line on which recording is to take place. In the chosen example, the laser beam is moved down to line 45. The deflection device is further effective to sweep the desired line. While the open loop mode of operation, employed to position the recording beam on the desired line, may not be capable of attaining the positional accuracy of closed loop servo operation, this is not significant for recording purposes, as will become clear from the explanation hereinbelow.

Concurrently with the sweep of the laser beam across the selected line 45, input signals are applied to the terminal 29 to modulate the laser beam. This action liberates the encapsulated dye in selected locations of line 45 to record the di-bit code shown, as well as to record the line 45 itself. When recording is complete in line 45, the deflection device moves the laser beam to the beginning of the next line in which recording is to take place.

The readout of the recorded information requires a very high positional accuracy and is preferably carried out entirely in the closed loop servo mode of operation. The source 26 is activated to switch the laser beam off and to again provide a low-energy light beam. As before, the prerecorded reference marks 52 are employed in order to provide coarse positioning of the beam 31 through the action of the positioning motor 32 which pivots the unit 24. The deflection device 30 subsequently takes over and causes the beam to be raised or lowered to the line which is to be read out. Since the lines themselves are now recorded, they can be recognized and counted until equality is indicated by the interpretive circuitry 42, between the applied address signals and the feedback signal derived at the output of the amplifier 40. Subsequent scanning of the desired line causes the photocells 38 to sense the recorded information which is read out through the amplifier 40 and which is thus applied to subsequently coupled utilization circuitry. From the foregoing explanation, it will be clear that the high-energy laser beam liberates the encapsulated dye of the medium 10 only in the area where the beam strikes the medium. Skipping of the beam by recording only the line, but without recording di-bits, is effected by appropriately modulating the beam.

Figure 5:
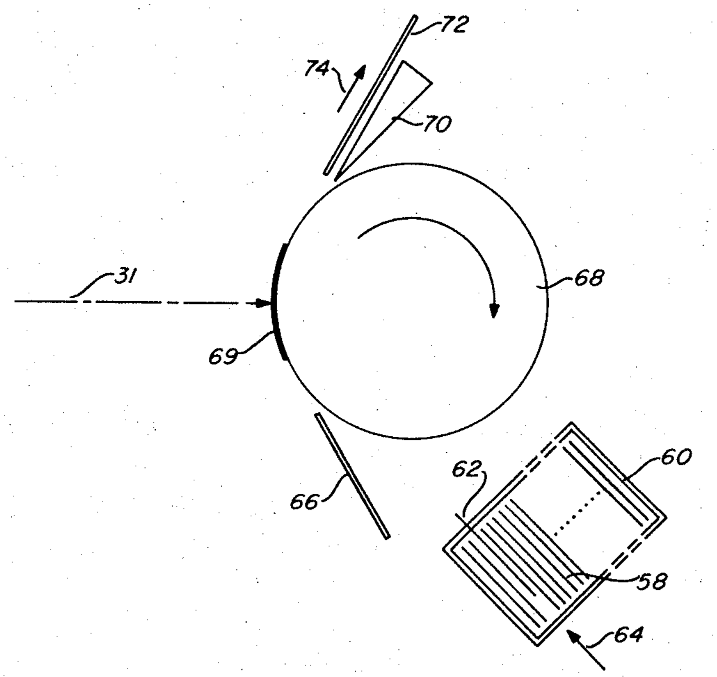
FIGURE 5 illustrates a modification of the embodiment shown in FIGURE 3 which is suitable for random access memory applications.

In the preferred embodiment of the invention which is illustrated in FIGURE 3, the medium has been assumed to remain stationary during recording and readout. FIGURE 5 illustrates a modified embodiment of the invention in which the medium is moved during recording as well as during readout. Here the medium is disposed on a flexible backing to form a recording strip. A plurality of such flexible strips 58 may be conveniently stored in a cartridge 60, as shown in FIGURE 5. Selection means, which may be of the type disclosed in a copending application of the same assignee, Ser. No. 469,269, are provided to urge a single chosen strip 62 from the cartridge in the direction of the arrow 64. A strip entry guide 66 guides the chosen strip into contact with the perforated peripheral surface of a rotating drum 68, on which it may be held by vacuum pressure applied internally of the drum. A strip 69 is shown positioned in such manner on the drum surface. As the drum 68 rotates, the stationary beam 31 sweeps a complete line of the strip. Thus, the beam need only be lowered or raised, as desired, to position it on different lines during subsequent drum rotations.

When recording (or readout) is completed on the strip 69, it is selectively stripped off the drum surface by the stripper guide 70. The latter, together with an exit guide 72, forms a raceway adapted to remove the strip in the direction of the arrow 74. The strip is subsequently returned, to the cartridge 60, e.g. by return means disclosed in the aforesaid copending application.

The applicability of the apparatus shown in FIGURE 5 to random access memory applications will be readily apparent to those skilled in the art. Such applications require frequent updating of records which may appear on different strips. Since the medium of the present invention needs no further developing step following recording thereon, additional information may be recorded in any record at any time, provided space is available.

Figure 6:
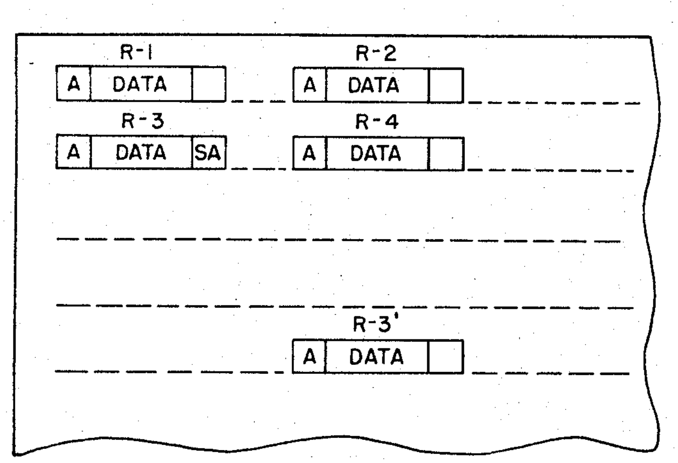
FIGURE 6 illustrates a record format which is suitable for random access memory applications.

FIGURE 6 shows an exemplary data organization suitable for random access memory applications, wherein digitally recorded information is arranged in the form of records. For the sake of illustration, records R–1, R–2, R–3 and R–4 only are indicated. Each of these records is originally recorded in the manner discussed above and includes at least an initial address portion "A," a data portion and a space. The address portion states the address of the record itself and permits the record to be located rapidly by comparing its address to the address of the desired record, through the use of the interpretive circuitry 42.

Let it be assumed that the record R–3 is to be updated. Since the recorded information itself cannot be changed, this requires that the record be re-written as a substitute record at a different address. In such a case, the substitute address "SA," i.e. the address of the substitute record R–3′, is recorded in the space following the data contents of the record R–3, by using the recording procedure outlined above. The updated data contents will then appear in the appropriate portion of the record R–3′, preceded by the address of the latter record. If it is desired to read out the substitute data contents, the record R–3 will first be addressed. The substitute address recorded therein is then read out and is used to address the substitute record R–3′. The presence of the substitute address is indicative of the fact that the data contents of R–3 are to be disregarded. An exemplary implementation of the above-described updating procedure is disclosed in the aforesaid copending application. Clearly, the record R–3′ can be further updated in the same way. Thus, while the medium does not permit a direct modification of the recorded data, as is the case in magnetic recording systems, the flexibility of a random access mass memory system is nevertheless preserved in the present invention since records can be freely updated.

It will be apparent from the foregoing explanation that the invention is not limited to the preferred embodiments illustrated and discussed. As previously explained, the encapsulated chemicals may constitute a dye which is liberated by the heat of the high-energy beam. Alternatively, they may be separately encapsulated and be adapted to react chemically when liberated, to provide a characteristic color. The encapsulant, which may consist of a wax or a plastic, need not be opaque where the chemicals themselves are colorless. The backing for the medium may be rigid or flexible, a variety of materials being feasible for this purpose.

It will also be clear that the high-energy beam which provides the heat for bursting the capsules need not necessarily be a laser beam. A suitable high-energy beam of high resolution may also be generated by an arc lamp, a flash tube, or the like. Beam modulation may occur in a variety of ways. For the recording of digital data, the high-energy beam may be selectively turned on or off at the source 26. Alternatively, a shield may be interposed by the modulating unit 28 to prevent recording from taking place at chosen locations. The unit 28 may control the positioning of a mask 27 in front of the deflection device 30, as shown in dotted outline in FIGURE 3. The mask may be used to print the desired character or to form a picture. For printing the same character at different locations, the mask may be moved or, alternatively, the mask may be stationary and the deflection device 30 may move the beam. Beam deflection in response to the applied address signals may take place by any one of a number of known techniques, e.g. by acoustic, mechanical, or electronic deflection, or combinations of these. It will be recognized that these may include the reflection of the beam 31 onto the surface 14, e.g. by means of a reflector movably suspended in a galvanometer movement.

The movement of the medium relative to the beam, where such is desired, may occur in a variety of ways and is not confined to the embodiment shown in FIGURE 5. For example, the medium and its backing may take the form of a disc which is rotated about its axis through suitable drive means. Recording (or readout) of different tracks then occurs by positioning beam radially of the disc. Nor is the present invention confined to the use of the digital recording scheme shown. Various methods may be employed to represent digital data, all of which are well known in the art.

The present invention is not limited to printing, but has wide application in the graphic arts field. For example, it is possible to form half tones by modulating the intensity of the high-energy beam or the duration of its application. In this manner the number of capsules that burst, and hence the color intensity of the mark recorded, may be regulated. As previously explained, color printing is possible by encapsulating primary color dyes in adjacent bands such that, when these dyes are liberated, the desired color is actually or visually produced. Alternatively, the ultimately desired colors may be directly encapsulated.

Figure 7:
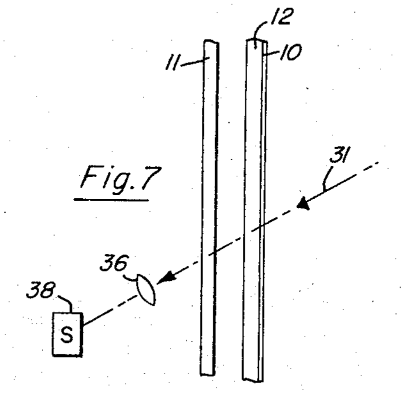
FIGURE 7 illustrates a further embodiment of the readout apparatus shown in FIGURE 3.

As illustrated and described with reference to the preferred embodiment of FIGURE 3, the readout of recorded data occurs by the reflection of a light beam of relatively low intensity by the surface 14 and the subsequent detection of darkness variations of the reflected beam. In such a case, the substrate may carry a film of encapsulated chemicals on both surfaces. Where the film appears on one surface only, the medium may permit the readout beam 31 to pass through it. This embodiment is illustrated in FIGURE 7, wherein applicable reference numerals have been retained. In this arrangement, the optical system 36 and the sensing means 38 are positioned behind the medium which comprises the film 10 and the backing 12. If the medium passes light, except in those areas where marks have been recorded, it is also possible to produce copies of a mark-bearing medium by positioning a light-sensitive material 11 in close proximity behind the medium and illuminating the latter from the front, either by means of the focused light beam, or from a general source of illumination.

As different general areas of a medium are addressed, the sensing means may themselves require to be positioned in order to receive the beam reflected from, or passing through, the medium. The positioning motor 32 may be advantageously employed for this purpose. Alternatively, a separate motor, energized from the interpretive circuitry, may be employed.

It will be apparent from the foregoing disclosure of the invention that numerous modifications, changes and equivalents will now occur to those skilled in the art, all of which fall within the true spirit and scope contemplated by the invention.

What is claimed is:

1. In combination, a recording medium having a film of encapsulated chemicals deposited on at least one surface thereof, a source for selectively generating at least one focused high-energy beam, said high-energy beam being adapted to liberate said chemicals from their encapsulant in a discrete location of said surface so as to record a mark thereon, said source further including means for selectively generating a low-energy beam, means responsive to an address signal for directing said beams to selected discrete locations of said surface, means responsive to received input signals for modulating the energy applied by said high-energy beam, and means for reading out said recorded marks with said low-energy beam from said discrete locations.

2. The apparatus of claim 1 wherein said chemicals comprise a dye embedded in an opaque encapsulant.

3. The apparatus of claim 1 wherein dyes of different colors are separately encapsulated in adjacent locations on said surface, said adjacent locations having a mutual spacing resolvable by said beam but unresolvble by the human eye at a normal viewing distance.

4. The apparatus of claim 1 wherein different chemicals are separately encapsulated at adjacent ones of said discrete locations, said chemicals being adapted, upon being liberated, to react with each other to produce a marking substance having a predetermined color.

5. The apparatus of claim 1 wherein said modulating means include means for controlling the time interval for which said high-energy beam is applied to each of said discrete locations.

6. The apparatus of claim 1 wherein said modulating means include means for controlling the intensity of said high-energy beam.

7. The apparatus of claim 1 wherein said modulating means include masking means adapted to limit said high-energy beam to a predetermined pattern on said surface.

8. The apparatus of claim 1 wherein said medium is adapted to pass light wherever recorded marks do not appear, and further including means for positioning a light-sensitive medium behind said first-recited medium bearing recorded marks, and means for selectively illuminating the front of said first-recited medium to expose said light-sensitive medium to light except in areas shielded by said recorded marks.

9. The apparatus of claim 1 wherein said source is selectively adapted to generate a high-energy laser beam or a low-energy light beam.

10. The apparatus of claim 1 wherein said low-energy beam is a light beam, said readout means including sensing means responsive to the reflection of said light beam from said surface to provide a responsive output signal.

11. The apparatus of claim 1 wherein said readout means include sensing means positioned behind said medium, said sensing means being responsive to said low-energy beam transmitted through said medium to provide a responsive output signal.

12. The apparatus of claim 1 and further including coarse-position reference marks pre-recorded on said surface, said marks being grouped in spaced alignment to define lines on said surface, successive ones of said lines being spaced from each other to permit the recording of additional lines therebetween.

13. The apparatus of claim 1 wherein said beam directing means include means for deflecting said beams through an angle adapted to reach all locations within an area of predetermined size, a motor adapted to move said deflecting means to position said beams at different ones of said areas, and an interpretive circuit responsive to said address signals and to signals derived from said readout means to energize said beam directing means.

14. The apparatus of claim 1 wherein said recording medium takes the form of a plurality of discrete units, means for selecting a chosen one of said plurality of units, means for moving said selected unit to expose different locations thereof to said beams, and means for returning said selected unit to said plurality of units.

15. In combination, a recording medium having a film of encapsulated chemicals deposited on at least one surface thereof, a source for selectively generating at least one focused high-energy beam, said high-energy beam being adapted to liberate said chemicals from their encapsulant in a discrete location of said surface so as to record a mark thereon, means responsive to received input signals for modulating the energy applied by said beam, means responsive to an address signal for directing said beam to selected discrete locations arranged in spaced lines on said surface and grouped to form records, each record including its own data contents as well as its own address and a linking address space, means for updating an original record, said updating means including means for recording a substitute record at a different address on said surface, said substitute record including the updated data contents of said original record, and means for recording the address of said substitute record in said linking address space of said original record.

References Cited

UNITED STATES PATENTS

| | | | |
|---|---|---|---|
| 2,800,077 | 7/1957 | Marron | 117—36.1 X |
| 2,939,009 | 5/1960 | Tien | 250—65 |
| 2,967,784 | 1/1961 | Newman et al. | 250—65 |
| 3,090,687 | 5/1963 | Berman. | |
| 3,154,371 | 10/1964 | Johnson | 346—76 X |
| 3,181,170 | 4/1965 | Akin | 346—76 X |
| 3,266,393 | 8/1966 | Chitayat | 95—1.1 |
| 3,287,736 | 11/1966 | Germer | 346—74 |
| 3,301,439 | 1/1967 | Kosar et al. | 250—65 |

RICHARD B. WILKINSON, *Primary Examiner.*

J. W. HARTARY, *Assistant Examiner.*